United States Patent
Sheth

(10) Patent No.: US 12,273,211 B2
(45) Date of Patent: Apr. 8, 2025

(54) METHODS AND SYSTEMS FOR DYNAMICALLY GENERATING CONTENT AND PROVIDING ACCESS TO THE GENERATED CONTENT DURING DISPLAY OF A FIRST VIDEO

(71) Applicant: Kyron Learning, PBC, Los Altos, CA (US)

(72) Inventor: Rajen Arun Sheth, Los Altos, CA (US)

( * ) Notice: Subject to any disclaimer, the term of this patent is extended or adjusted under 35 U.S.C. 154(b) by 0 days.

(21) Appl. No.: 18/391,510

(22) Filed: Dec. 20, 2023

(65) Prior Publication Data

US 2024/0146563 A1     May 2, 2024

Related U.S. Application Data

(63) Continuation-in-part of application No. 18/485,453, filed on Oct. 12, 2023.

(60) Provisional application No. 63/460,688, filed on Apr. 20, 2023, provisional application No. 63/415,800, filed on Oct. 13, 2022.

(51) Int. Cl.
| | |
|---|---|
| *H04L 12/18* | (2006.01) |
| *G09B 7/00* | (2006.01) |
| *H04L 65/1089* | (2022.01) |
| *H04L 65/613* | (2022.01) |
| *G06F 16/248* | (2019.01) |

(52) U.S. Cl.
CPC ............ *H04L 12/1831* (2013.01); *G09B 7/00* (2013.01); *H04L 65/1089* (2013.01); *H04L 65/613* (2022.05); *G06F 16/248* (2019.01)

(58) Field of Classification Search
CPC ...... H04L 65/613; H04L 65/1089; G09B 7/00
USPC .............................................. 348/14.02–14.9
See application file for complete search history.

(56) References Cited

U.S. PATENT DOCUMENTS

| | | | |
|---|---|---|---|
| 9,591,479 B1 | 3/2017 | Leavy | |
| 11,107,465 B2 | 8/2021 | Gustman | |
| 2016/0063873 A1* | 3/2016 | Zimmer | ................ G06Q 50/20 |
| | | | 434/353 |
| 2017/0229030 A1* | 8/2017 | Aguayo, Jr. | ............. G09B 7/02 |

(Continued)

OTHER PUBLICATIONS

Office Action (Non-Final Rejection) dated May 13, 2024 for U.S. Appl. No. 18/485,453 (pp. 1-14).

*Primary Examiner* — Maria El-Zoobi
(74) *Attorney, Agent, or Firm* — Blueshift IP, LLC; Cynthia M. Gilbert

(57) ABSTRACT

A method for generating and providing access to dynamically generated content includes receiving, by a recommendation engine, from a second computing device, a first user input responsive to a first segment of a video displayed to a user of the second computing device, the video comprising a plurality of segments. The recommendation engine identifies at least one prompt associated with the first segment of the video. The recommendation engine provides input to a large language model, the input including: (i) the at least one prompt; (ii) an instruction to analyze the at least one prompt and the first user input; and (iii) an instruction to generate a response to the first user input. The recommendation engine receives from the large language model dynamically generated content responsive to the input. The recommendation engine directs the second computing device to provide the user with access to the dynamically generated content.

13 Claims, 7 Drawing Sheets

(56) References Cited

U.S. PATENT DOCUMENTS

2019/0272775 A1    9/2019  Noble
2021/0369042 A1   12/2021  Gustman
2024/0046392 A1*  2/2024  Tudela .................. H04L 67/535
2024/0129345 A1    4/2024  Kassam

* cited by examiner

METHODS AND SYSTEMS FOR DYNAMICALLY GENERATING CONTENT AND PROVIDING ACCESS TO THE GENERATED CONTENT DURING DISPLAY OF A FIRST VIDEO

CROSS-REFERENCE TO RELATED APPLICATIONS

This application is a continuation in part of U.S. patent application Ser. No. 18/485,453, filed on Oct. 12, 2023, entitled "Methods and Systems for Dynamically Establishing a Video Conference Connection Between a Computing Device of a First User and a Computing Device of a Second User During a Viewing of a Video by the First User," which itself claims priority from U.S. Provisional Patent Application No. 63/415,800, filed on Oct. 13, 2022, entitled "Methods and Systems for Dynamically Establishing a Video Conference Connection Between a Computing Device of a First User and a Computing Device of a Second User During a Viewing of a Video by the First User," and from U.S. Provisional Patent Application 63/460,688, filed on Apr. 20, 2023, entitled "Methods and Systems for Dynamically Establishing a Video Conference Connection Between a Computing Device of a First User and a Computing Device of a Second User During a Viewing of a Video by the First User," each of which is hereby incorporated by reference.

BACKGROUND

The disclosure relates to methods for dynamically establishing video conferencing connections and displaying videos to users. More particularly, the methods and systems described herein relate to functionality for dynamically generating content and providing access to the generated content during display of a requested first video to a user.

Conventionally, when a user uses video to learn a subject, the user selects whether to view an asynchronous video—for example, by doing an Internet search for previously-recorded videos available either for free or for a fee—or to engage another individual to provide tutoring or other education via synchronous video, such as by setting up a video conferencing connection. Conventionally, asynchronous teaching videos follow a script where an expert lectures on subject matter and optionally provides access to additional materials for the learner to use. The expert may possibly include contact information allowing learners to reach them for additional information but conventional systems do not provide functionality allowing a user to establish a "live" (e.g., synchronous) video conference connection while the learner is watching the initial video. However, finding and hiring an expert to teach one user in a synchronous setting may be time-consuming, expensive, and unnecessary—the learner, for example, may have sufficient knowledge about subject matter to only need the expert to teach them certain subsets of the he subject matter or to answer certain types of questions. Furthermore, the technical process of generating content by a teacher is limited in that the teacher can typically only generate a limited amount of content and cannot predict and create content for all possible learner questions.

Therefore, there is a need for a technological solution that provides an asynchronous video to a learner while monitoring the learner's interaction with the video and then seamlessly and dynamically establishes a synchronous video conferencing connection between the learner and an available and qualified expert and then allowing the learner to continue using asynchronous video to continue learning after the conclusion of at least one synchronous video conference with the qualified expert.

Furthermore, there is a need for a technological solution that determines that the learner could be supported by a video solution instead of by a teacher and generating a video solution or other dynamically generated content tailored to the learner's needs so that the teacher need not connect with each learner at each moment when available content is insufficient to support the learner, without the increased burden on the teacher of attempting to create content that attempts to address all possible questions by all possible learners.

BRIEF DESCRIPTION

In one aspect, a method for dynamically generating content and providing access to dynamically generated content, during display of a first video to a user includes receiving, by a recommendation engine executed by a first computing device, from a second computing device, a first user input responsive to a first segment of a video displayed to a first user of the second computing device, the video comprising a plurality of segments. The method includes identifying, by the recommendation engine, at least one prompt associated with the first user input. The method includes providing, by the recommendation engine, input to a large language model, the input including: (i) the at least one prompt; (ii) an instruction to analyze the at least one prompt and the first user input; and (iii) an instruction to generate a response to the first user input. The method includes receiving, by the recommendation engine, from the large language model, dynamically generated content. The method includes directing, by the recommendation engine, the second computing device to provide the user with access to the dynamically generated content.

In another aspect, a method for dynamically generating and displaying, during display of a requested first video to a user, a second video includes executing, by a first computing device, a large language model. The method includes providing, by a training engine executed by the first computing device, to the large language model engine, at least one question included in a first segment of a video. The method includes receiving, by the training engine, from the large language model engine, at least one response to the at least one question. The method includes, analyzing, by the training engine, the received at least one response. The method includes generating, by the training engine, a recommendation to modify a second segment of the video responsive to the analysis.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The methods and systems described herein may provide functionality for dynamically establishing a video conference connection between a computing device of a first user and a computing device of a second user during a viewing of a video by the first user. In some embodiments, the methods and systems described herein provide functionality for seamlessly mixing the playback of AI-selected videos or segments of videos and the selection of a second user to pair with the first user, establishment of a synchronous video conference connection between the two users, and, upon receiving an indication that the users have completed the video conference, playback of a second AI-selected video or segment of video. In some embodiments, one of the users is a learner and the other is an expert—for example, and without limitation, in a formal educational setting, an informal educational setting, a setting in which one user is seeking to learn a skill or craft that the second user can teach, a customer service environment where one user is teaching the other how to resolve a service-related challenge, in a corporate setting where one user is learning from another user, and/or in a corporate setting where one user is mentoring or otherwise sharing expertise with another user. Although described herein as related to educational settings, the methods and systems described herein may also be implemented in non-educational settings in which one user is watching a series of videos or segments of videos and benefits from having the system identify a second user available for a "live" or synchronous video call. This may include any setting in which the first user can receive some data without guidance from another person but benefits from discussing the received data live—for example and without limitation, in a financial consultation or a legal setting where a first user may benefit from exposure to static information or asynchronous videos prior to consultation with a professional services provider.

Figure 1:
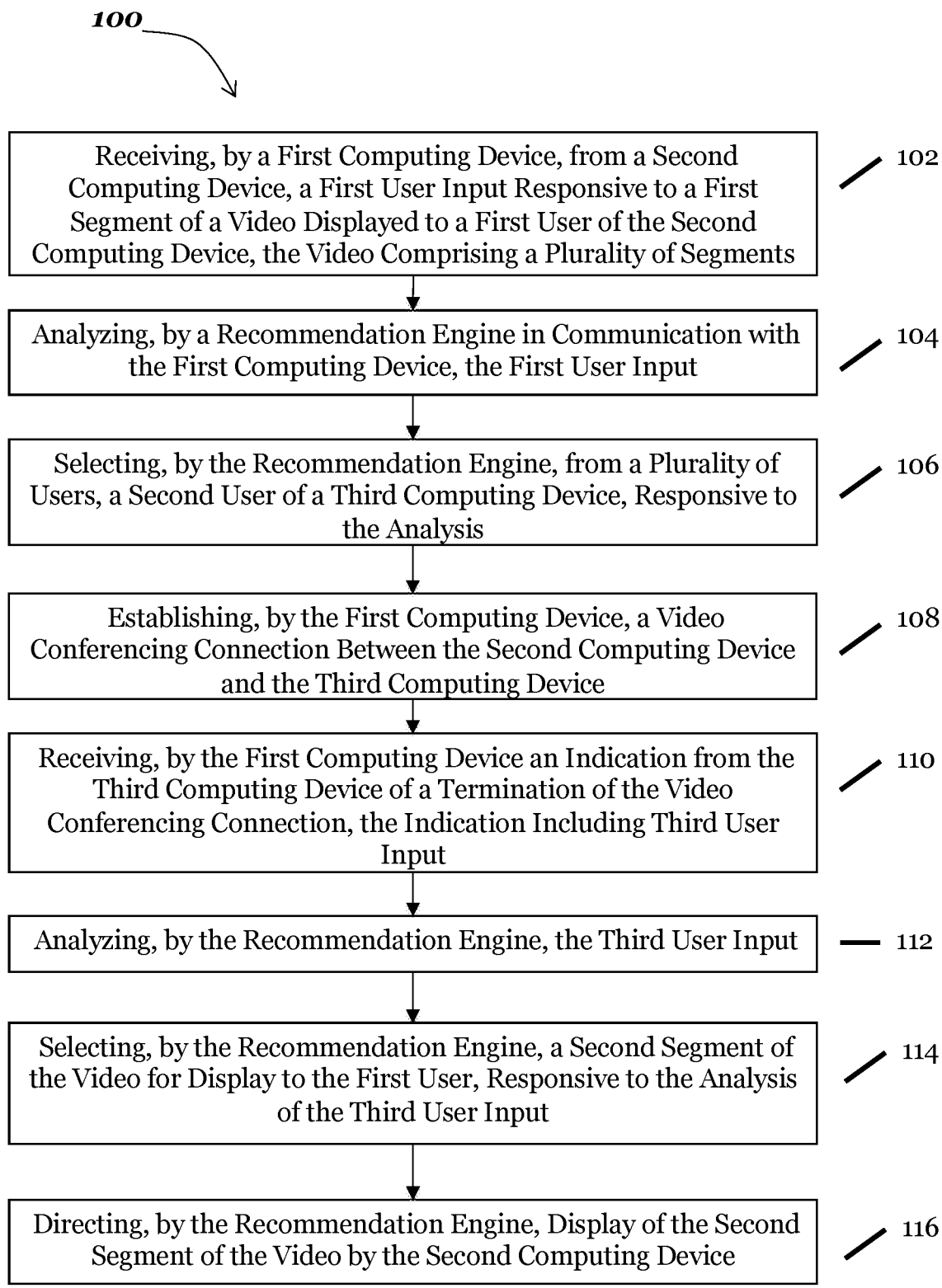
FIG. 1 is a flow diagram depicting an embodiment of a method for dynamically establishing a video conference connection between a computing device of a first user and a computing device of a second user during a viewing of a video by the first user.

Referring now to FIG. 1, a flow diagram depicts one embodiment of a method for dynamically establishing a video conference connection between a computing device of a first user and a computing device of a second user during a viewing of a video by the first user. In brief overview, the method 100 includes receiving, by a first computing device, from a second computing device, a first user input responsive to a first segment of a video displayed to a first user of the second computing device, the video comprising a plurality of segments (102). The method 100 includes analyzing, by a recommendation engine in communication with the first computing device, the first user input (104). The method 100 includes selecting, by the recommendation engine, from a plurality of users, a second user of a third computing device, responsive to the analysis (106). The method 100 includes establishing, by the first computing device, a video conferencing connection between the second computing device and the third computing device (108). The method 100 includes receiving, by the first computing device, an indication from the third computing device of a termination of the video conferencing connection, the indication including third user input (110). The method 100 includes analyzing, by the recommendation engine, the third user input (112). The method 100 includes selecting, by the recommendation engine, a second segment of the video for display to the first user, responsive to the analysis of the third user input (114). The method 100 includes directing, by the first computing device, display of the second segment of the video by the second computing device (116).

Figure 2A:
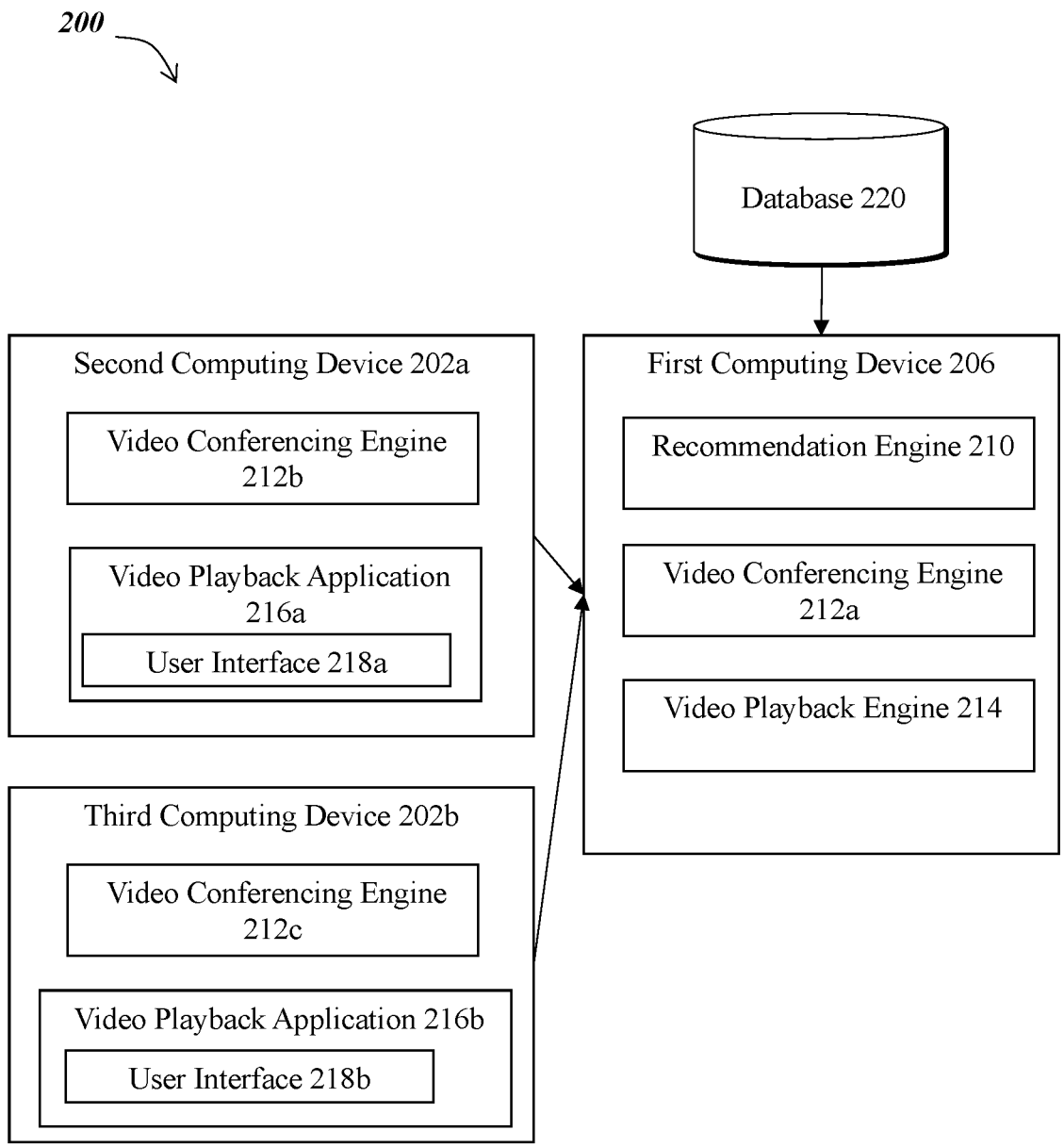
FIG. 2A is a block diagram depicting an embodiment of a system for dynamically establishing a video conference connection between a computing device of a first user and a computing device of a second user during a viewing of a video by the first user.

Referring ahead to FIG. 2A, in connection with FIG. 1, a block diagram depicts one embodiment of a system for dynamically establishing a video conference connection between a computing device of a first user and a computing device of a second user during a viewing of a video by the first user. In brief overview, the system 200 includes a first computing device 206, a second computing device 202a, a third computing device 202b, a recommendation engine 210, a video conferencing engine 212a, a video playback engine 214, a video conferencing engine 212b, a video playback application 216a, a user interface 218a, a video conferencing engine 212c, a video playback application 216b, a user interface 218b, and a database 220. The computing devices 202a, 202b, and 206 may be a modified type or form of computing device 400 (as described in greater detail below in connection with FIGS. 4A-C) that have been modified to execute instructions for providing the functionality described herein; these modifications result in a new type of computing device that provides a technical solution to problems rooted in computer technology, such as monitoring a user's interaction with a video, seamlessly and dynamically establishing a synchronous video conferencing connection between the learner and an available and qualified expert and then selecting a second asynchronous video to display to the learner for continued learning after the conclusion of at least one synchronous video conference with the qualified expert.

The recommendation engine 210 may be provided as a software component. The recommendation engine 210 may be provided as a hardware component. The computing device 206 may execute the recommendation engine 210. The recommendation engine 210 may include or be in communication with a natural language processor. The recommendation engine 210 may include or be in communication with an optical character recognition module. The recommendation engine 210 may include or be in communication with a machine learning engine used for receiving data about a user and selecting a video for playback to the user. The recommendation engine 210 may include or be in communication with a machine learning engine used for receiving data about a user and selecting another user and recommending that the system 200 establish a connection between the two users.

The video conferencing engines 212a-c may be provided as a software component. The video conferencing engines 212a-c may be provided as a hardware component. The computing device 206 may execute the video conferencing engine 212a. The computing devices 202a-b may executing video conferencing engines 212b-c. The video conferencing engine 212a may be in communication with the recommendation engine 210 and may receive an identification of users for which the video conferencing engine 212a is to establish a video conferencing connection. The video conferencing engine 212a may use WebRTC to establish the video conferencing connection.

The video playback engine 214 may be provided as a software component. The video playback engine 214 may be provided as a hardware component. The computing device 206 may execute the video playback engine 214.

The video playback application 216a-b may be provided as a software component. The video playback application 216a-b may be provided as a standalone application executing on a client computing device 202a or 204. The video playback application 216a-b may be provided as a plug-in or other add-on component to an existing application executed by the client computing device 202 or 204, such as a web browser application. The video playback application 216a-b may be provided as a hardware component. The computing device 202a may execute the video playback application 216a. the computing device 202b may execute the video playback application 216b.

The computing device 206 may include or be in communication with the database 220. The database 220 may store data related to user profiles. The database 220 may store data related to videos and a plurality of segments within each of the videos. The database 220 may store mappings between characteristics within user profiles identified as profiles for learners and characteristics within user profiles identified as profiles for experts. The database 220 may store videos.

The database 220 may be an ODBC-compliant database. For example, the database 220 may be provided as an ORACLE database, manufactured by Oracle Corporation of Redwood Shores, CA. In other embodiments, the database 220 can be a Microsoft ACCESS database or a Microsoft SQL server database, manufactured by Microsoft Corporation of Redmond, WA. In other embodiments, the database 220 can be a SQLite database distributed by Hwaci of Charlotte, NC, or a PostgreSQL database distributed by The PostgreSQL Global Development Group. In still other embodiments, the database 220 may be a custom-designed database based on an open source database, such as the MYSQL family of freely available database products distributed by Oracle Corporation of Redwood City, CA. In other embodiments, examples of databases include, without limitation, structured storage (e.g., NoSQL-type databases and BigTable databases), HBase databases distributed by The Apache Software Foundation of Forest Hill, MD, MongoDB databases distributed by ioGen, Inc., of New York, NY, an AWS DynamoDB distributed by Amazon Web Services and Cassandra databases distributed by The Apache Software Foundation of Forest Hill, MD. In further embodiments, the database 220 may be any form or type of database.

Although, for ease of discussion, the first computing device 206, the recommendation engine 210, the video conferencing engine 212a, the video playback engine 214, and the database 220 are described in FIG. 2 as separate modules, it should be understood that this does not restrict the architecture to a particular implementation. For instance, these components may be encompassed by a single circuit or software function or, alternatively, distributed across a plurality of computing devices.

Referring again to FIG. 1, in greater detail and in connection with FIG. 2A, the method 100 includes receiving, by a first computing device, from a second computing device, a first user input responsive to a first segment of a video displayed to a first user of the second computing device, the video comprising a plurality of segments (102). In some embodiments, the first computing device 206 transmits a single video to the second computing device 202, with the single video accompanied by data indicating to the second computing device 202 a plurality of segments within the single video intended for playback. In other embodiments, the first computing device 206 transmits a plurality of videos to the second computing device 202. The first computing device 206 may transmit instructions to the second computing device 202 specifying a video or segment of a video to begin playing to the user of the second computing device 202.

The second computing device 202 may execute a video playback application 216a. The second computing device 202 may generate a display of the user interface 218a as part of executing the video playback application 216. The user interface 218a may allow a user of the second computing device 202 to enter user input responsive to data provided by a video displayed by the video playback application 216. As an example, and without limitation, the user of the second computing device 202a may have requested a session in which the user could learn a mathematical skill; the first computing device 206 may have transmitted to the second computing device 202a a video and specified a time segment within the video at which to being playback to the user. The video may display a teacher giving a lesson on the mathematical skill and the teacher may pose a question to the user which the user may answer by providing input into the user interface. The system 100 may use browser functionality to overlay a user interface element onto the display of a video conferencing connection The method 100 includes analyzing, by a recommendation engine in communication with the first computing device, the first user input (104). The recommendation engine 210 may analyze the first user input to determine whether to play a second segment of the video for the first user. The recommendation engine 210 may analyze the first user input to determine whether to select an expert that should teach the user an aspect of the subject matter of the video. The recommendation engine 210 may execute a natural language processing module to analyze the first user input. The recommendation engine 210 may execute an optical character recognition module to analyze the first user input.

As an example, and without limitation, if a student user of the second computing device 202 is watching an instructional video on how to change a tire, crochet a granny square, solve a single-variable equation, or other skill, the asynchronous video being played to the student user may stop at the end of a segment or at the end of the video itself and present a user interface to the student user requesting user input related to the lesson (e.g., what steps do you take before loosening the lug nuts, how many double crochets did you work in your foundation ring, have you isolated the variable terms, and so on as appropriate for the content displayed in the video). The user interface may provide user interface elements for entering user input, such as without limitation, drop-down menu options where the user may select from predefined answer choices, text fields where the user may enter unstructured data, or photograph fields where a user may upload a photograph with an answer depicted in the photo. The recommendation engine 210 may receive the user input and determine what type of data has been received and what type of analysis to conduct (e.g., a mapping between a selected drop down answer and an indication of whether the answer is correct or not, execution of a natural language processing module and analysis of the resulting output, execution of an optical character recognizer (OCR) and analysis of the resulting output, and so on). The recommendation engine 210 may receive the output of the analysis and determine whether to select and play a second segment of the video or a second video for the first user (the student user) or whether the student user should be connected with a second user (a subject matter expert) for a synchronous communication session (e.g., a video call). The recommendation engine 210 may access a mapping between a type of user input (e.g., "wrong answer to question 3 after watching video A9" or "correct answer to question 3 after watching video A9") or a characteristic of the user input identified during analysis (e.g., "The stitches displayed in the picture responding to question 4 of video Bio are 4 single crochets; the correct answer would have been two double crochets followed by three chains" or "The car shown in the pictures responding to question 5 of video C14 has not had all lug nuts removed") and an action to take (e.g., the system needs to display video A7 on isolating variable terms, the system needs to display video B6 on single crochet vs double crochet, the system needs to display video C12 on ensuring all lug nuts are removed). Alternatively, the mapping may pair a type of user input or a characteristic of a user input with an indication that the user should be paired with an identified type of second user and that the system should establish a synchronous communication setting between the user and a user of the identified type (e.g., the student user is experiencing a challenge with a level 3 issue, is a visual learner, and does poorly with sports analogies; the student user should be paired with an XYZ type subject matter expert who has expertise in level 3 issues for visual learners and uses theatre-based analogies instead of sports-based analogies). User input may include text, images, and voice input.

If the recommendation engine 210 determines to select and play a second segment of the video for the first user, the method may include identifying, by the first computing device, a characteristic of the first user input; accessing, by the first computing device, a mapping between the characteristic and at least one of the plurality of segments in the video; and identifying, by the first computing device, a second segment of the video for selection based on the mapping. During the display of the second segment of the video to the first user, the first computing device 206 may receive, from the second computing device 202a, a second user input responsive to the second segment of a video displayed to the first user of the second computing device. The recommendation engine 210 may analyze the first user input and the second user input and again determine whether to play a second segment of the video for the first user or to select an expert that should teach the user an aspect of the subject matter of the video. The cycle of playing video segments and analyzing user input may continue until the first user has viewed all the video segments or until the recommendation engine 210 determines to connect the first user with a second user for a live (synchronous) video conference.

The recommendation engine 210 may analyze a profile of the first user to identify at least one characteristic in the profile, in addition to analyzing the first user input. The recommendation engine 210 may access a mapping between the at least one characteristic a identified in the profile and a characteristic of a profile of the second user of the third computing device. By way of example and without limitation, the recommendation engine 210 may identify at least one characteristic in the first user profile indicating that the first user is a visual learner. As another example and without limitation, the recommendation 210 may identify at least one characteristic in the first user profile indicating that the first user likes sports. As another example and without limitation, the recommendation 210 may identify at least one characteristic in the first user profile indicating that the first user learns well when working with experts that teach according to a particular pedagogical approach. As another example and without limitation, the recommendation 210 may identify at least one characteristic in the first user profile indicating that the first user learns well when working with experts who have a particular background. As another example and without limitation, the recommendation 210 may identify at least one characteristic in the first user profile indicating that the first user learns well when working with experts who are in a particular demographic group. The recommendation engine 210 may use the at least one characteristic in selecting an expert to teach the first user, that is, the method may include selecting the second user responsive to the analysis of the first user input and the profile and the accessed mapping.

The method 100 includes selecting, by the recommendation engine, from a plurality of users, a second user of a third computing device, responsive to the analysis (106). For example, the recommendation engine 210 may access a mapping between characteristics and available second users to identify a second user available to assist the first user and having the characteristics likely to improve the effectiveness of an interaction between the first user and the second user.

The method 100 includes establishing, by the first computing device, a video conferencing connection between the second computing device and the third computing device (108).

The method 100 includes receiving, by the first computing device, an indication from the third computing device of a termination of the video conferencing connection, the indication including third user input (110).

The method 100 includes analyzing, by the recommendation engine, the third user input (112).

The method 100 includes selecting, by the recommendation engine, a second segment of the video for display to the first user, responsive to the analysis of the third user input (114). The selection of the second segment may occur as described above in connection with (104) and determining based upon analyzed user input whether and which video segments to play to the user of the second computing device 202.

The method 100 includes directing, by the first computing device, display of the second segment of the video by the second computing device (116).

The method may include generating a report including an identification of at least one characteristic in the user profile. The method may include generating an assessment that summarizes a level of learning of the student based upon one or more analyses by the recommendation engine. The method may include mapping an output of an analysis of at least one item of user input to a skill level and generate an assessment including the mapped skill level.

As indicated above, the recommendation engine 210 may execute an optical character recognition module to analyze the first user input. In one embodiment, therefore, the methods and systems described herein may include a method for selecting video segments for playback to learners. Such a method may include receiving, by a first computing device, from a second computing device, a first user input responsive to a first segment of a video displayed to a first user of the second computing device, the video comprising a plurality of segments, wherein the first user input includes at least one image; analyzing, by an optical character recognition module executed by the first computing device, the at least one image; and selecting, by the first computing device, a second segment of the video for display to the user, responsive to the analysis of the at least one image.

The methods and systems described herein may include a method for dynamically establishing a video conference connection between a computing device of a first user and a computing device of a second user during a viewing of a video by the first user. Such a method may include receiving, by a first computing device, from a second computing device, a first user input responsive to a first segment of a video displayed to a first user of the second computing device, the video comprising a plurality of segments, wherein the first user input includes at least one image; analyzing, by an optical character recognition module executed by the first computing device, the at least one image; selecting, by a recommendation engine in communication with the first computing device, from a plurality of users, a second user of a third computing device, responsive to the analysis of the at least one image; establishing, by the first computing device, a video conferencing connection between the second computing device and the third computing device; receiving, by the first computing device, an indication from the third computing device of a termination of the video conferencing connection, the indication including third user input; analyzing, by the first computing device, the third user input; selecting, by the first computing device, a third segment of the video for display to the first user, responsive to the analysis of the third user input; and directing, by the first computing device, display of the third segment of the video by the second computing device.

The methods and systems described herein may provide functionality for generating a simulation of an interaction between a first user and a first segment of a video displayed to the first user, wherein the system executes a large language model (LLM) engine to generate user input for use during the simulation of the interaction. A method may include executing an LLM engine to generate responses to provide to a question included in the first segment of the video. The method may include providing, by a training engine executed by the first computing device, to the large language model engine, at least one question included in a first segment of a video. As an example, the training engine may extract a question from a first segment of a video and provide the extracted question to the LLM engine in order to receive responses that simulate responses that human users might provide when answering the same question after watching the same segment of the video. As another example, the training engine may extract the question from a flowchart or a data structure containing a plurality of questions that are available for incorporation into one or more videos. The method may include receiving, by the training engine, from the large language model engine, at least one response to the at least one question. As will be understood by those of ordinary skill in the art, large-language models (LLMs) include very large deep neural networks trained to continue an input sequence of text. For instance, an LLM may be provided with an input sequence such as "I went to the store to" and generate the output sequence "buy some milk". The LLM engine may have been trained on a variety of types of questions and may provide possible responses to the question informed by the types of responses provided to different questions that have an underlying characteristic in common with the question in the simulation. The method may include receiving, by the training engine, from the large language model engine, at least one response to the at least one question. The method may include analyzing, by the training engine, the received at least one response. The method may include generating, by the training engine, a recommendation to modify a second segment of the video responsive to the analysis. The method may include modifying the second segment of the video. The method may include generating, by the training engine, a recommendation to modify the first segment of the video responsive to the analysis. The method may include modifying the first segment of the video. The method may include generating a display of the at least one question and the at least one response and the recommendation and receiving user input including an instruction to make the recommended modification. The method may include generating a display of the at least one question and the at least one response and the recommendation and receiving user input including an instruction to make a modification other than the recommended modification. The method may include generating a display of the at least one question and the at least one response and the recommendation and receiving user input including an instruction not to make the recommended modification.

The training engine may further include or be in communication with a machine learning engine. The training engine may be specially trained to provide the functionality of the machine learning engine. The machine learning engine may analyze at least one response generated by the LLM engine. The training engine may further include or be in communication with a machine learning engine that may generate the recommendation to modify one or more segments of the video based upon the analysis. The machine learning engine may determine a level of likelihood that the generated at least one response in the simulated interaction would be the response generated by a user after display to the user of the first segment of the video.

Therefore, the system 200 may execute an LLM engine to improve the quality of available responses for display to subsequent users providing input to the system 200. In some embodiments, the system 200 may execute an LLM engine that dynamically generates new content that may be provided to users in response to received input instead of or as a prerequisite to connecting the first user with a second, human user.

Figure 2B:
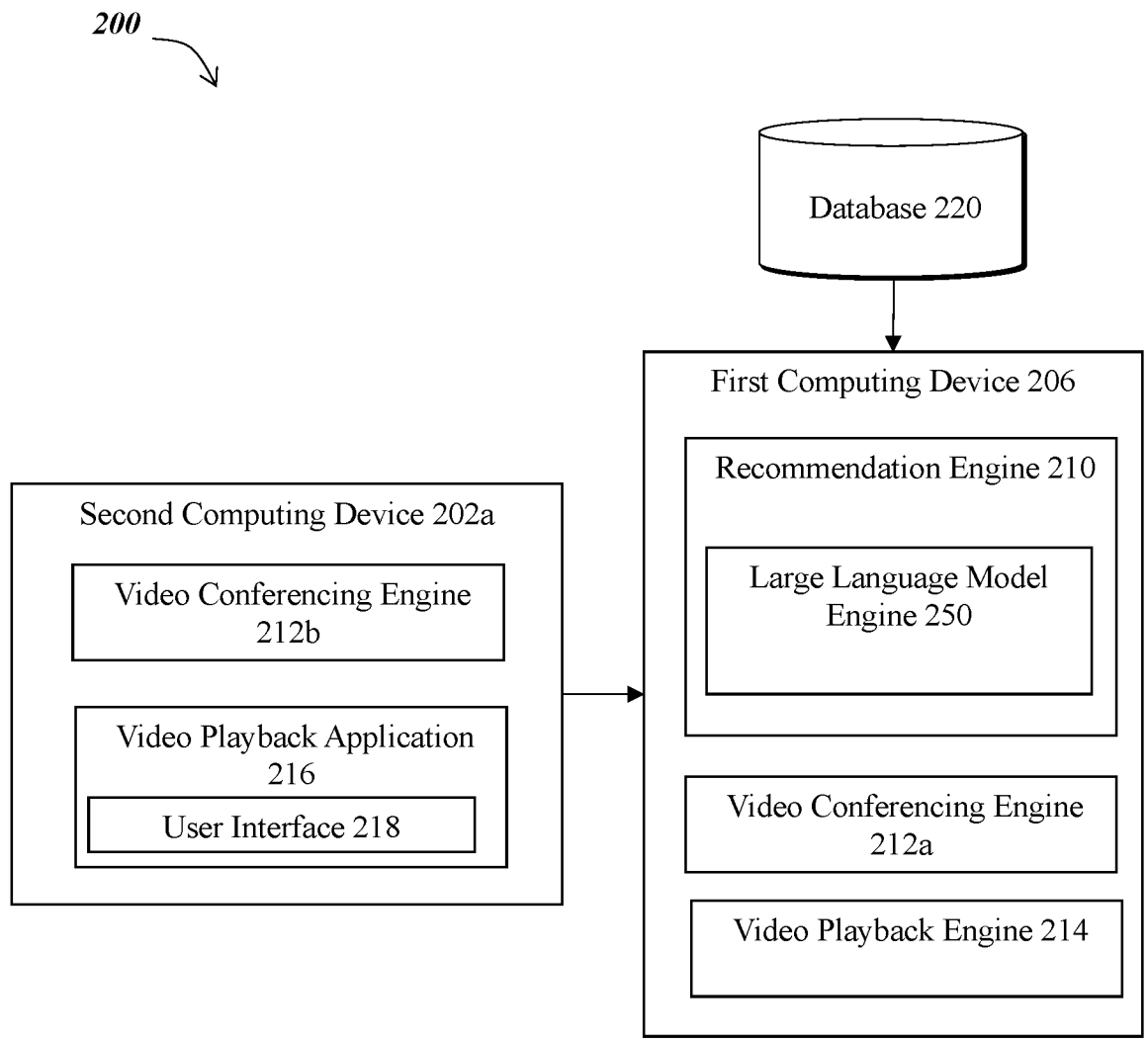
FIG. 2B is a block diagram depicting an embodiment of a system for dynamically generating content and providing access to dynamically generated content, during display of a first video to a user.

Referring now to FIG. 2B, the system 200 as described above may also include a large language model (LLM) engine 250. As shown in FIG. 2B, the recommendation engine 210 may execute the LLM engine 250. In other embodiments, not shown, the LLM engine 250 may execute on a second computing device 206 and the recommendation engine 210 may be in communication with the LLM engine 250. As shown in FIG. 2B, instead of or prior to connecting the second computing device 202a with a third computing device 202b, the second computing device 202a and the first computing device 206 are in communication.

Figure 3:
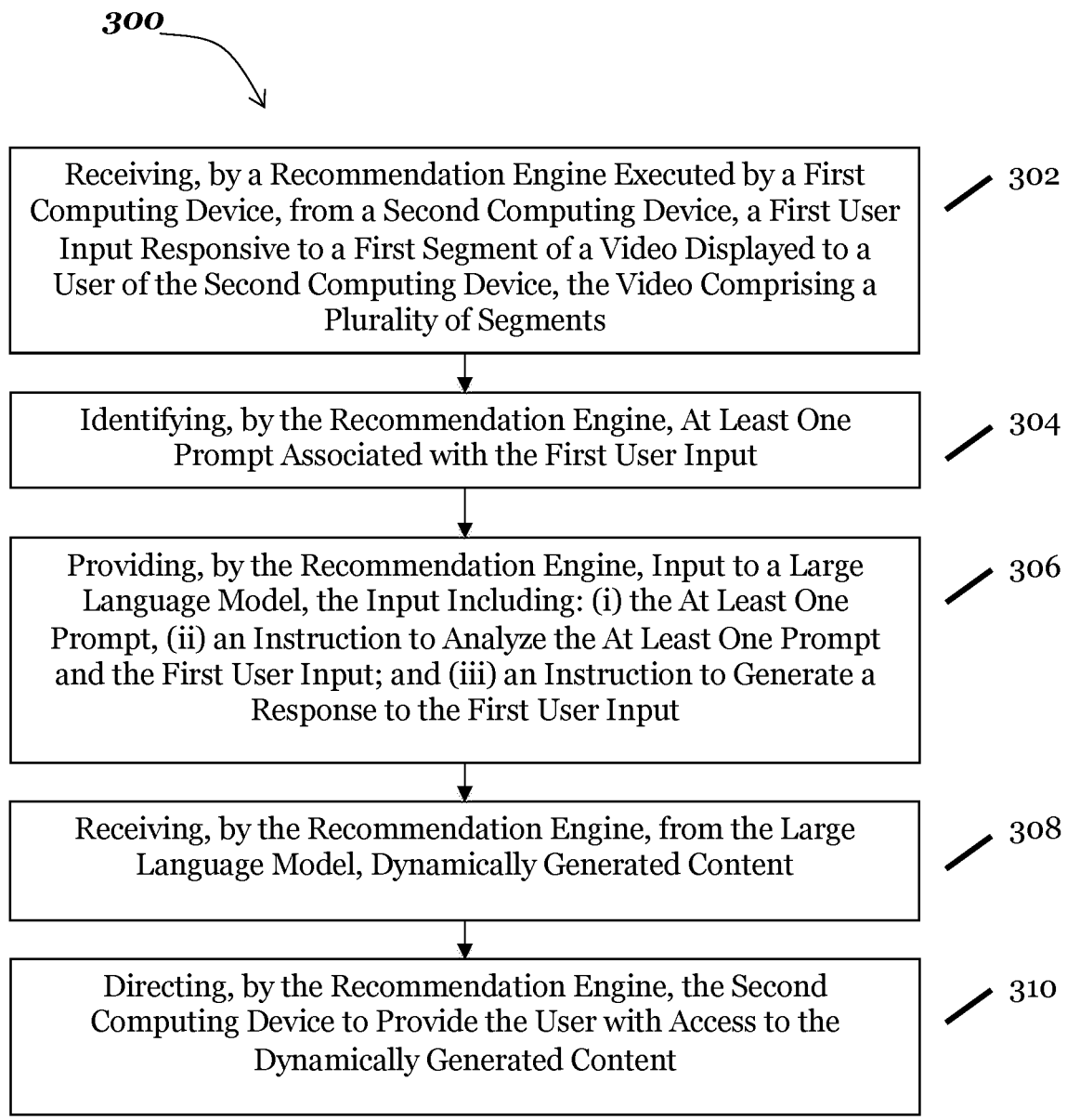
FIG. 3 is a flow diagram depicting one embodiment of a method for dynamically generating content and providing access to dynamically generated content, during display of a first video to a user.

Referring now to FIG. 3, and in connection with FIGS. 1 and 2A-2B, a flow diagram depicts one embodiment of a method 300 for dynamically generating content and providing access to dynamically generated content, during display of a first video to a user. In brief overview, the method 300 includes receiving, by a recommendation engine executed by a first computing device, from a second computing device, a first user input responsive to a first segment of a video displayed to a user of the second computing device, the video comprising a plurality of segments (302). The method 300 includes identifying, by the recommendation engine, at least one prompt associated with the first user input (304). The method 300 includes providing, by the recommendation engine, input to a large language model, the input including: (i) the at least one prompt; (ii) an instruction to analyze the at least one prompt and the first user input; and (iii) an instruction to generate a response to the first user input (306). The method 300 includes receiving, by the recommendation engine, from the large language model, dynamically generated content (308). The method 300 includes directing, by the recommendation engine, the second computing device to provide the user with access to the dynamically generated content (310).

Referring now to FIG. 3 in greater detail, the method 300 includes receiving, by a recommendation engine executed by a first computing device, from a second computing device, a first user input responsive to a first segment of a video displayed to a user of the second computing device, the video comprising a plurality of segments (302). Receiving the first user input may occur as described above in connection with FIG. 1 at 102.

The method 300 includes identifying, by the recommendation engine, at least one prompt associated with the first user input (304). The recommendation engine 210 may analyze the received user input as described above in connection with FIG. 1 at 104. The recommendation engine 210 may further analyze the received user input to identify concepts associated with the first user input and identify prompts associated with the identified concept or concepts (e.g., by querying a database or a mapping table that stores such associations). The recommendation engine 210 may execute a semantic analysis engine to determine a concept associated with words typed or uttered and forming some or all of the first user input. Alternatively, the recommendation engine 210 may directly identify at least one prompt associated with the user input (e.g., instead of first identifying concepts within the user input, the recommendation engine 210 may access associations between one or more key words contained within the first user input and at least one prompt). As another example, the recommendation engine 210 may execute a natural language processor to analyze the first user input and identify a concept expressed by the first user input and/or to directly identify a prompt associated with the first user input.

The recommendation engine 210 may generate or retrieve a prompt to provide to the LLM engine 250 in order to request generation of content that responds to the first user input. The prompt may include, by way of example, information provided by a teacher for responding to user input. For instance, a teacher may identify a common question often asked in connection with a segment of a lesson and may create a prompt that can be used to generate content responding to that common question, including without limitation, explanations the teacher has previously used to answer the question, examples that convey a lesson underlying the lesson differently than the segment of the video conveyed the lesson, examples of mistakes or misconceptions students asking the question may make, and so on. As another example, the recommendation engine 210 may use information associated with the student to supplement the at least one prompt and the first user input. For example, the recommendation engine 210 may provide the LLM engine 250 with input that also includes information about the lesson, about the student, about previous answers given by the student, about the teacher, and/or other information relevant to generating a response to the first user input.

The method 300 includes providing, by the recommendation engine, input to a large language model, the input including: (i) the at least one prompt; (ii) an instruction to analyze the at least one prompt and the first user input; and (iii) an instruction to generate a response to the first user input (306). The LLM engine 250 may use the received input to dynamically generate content including a response to the first user input.

The method 300 includes receiving, by the recommendation engine, from the large language model, dynamically generated content (308). The recommendation engine 210 may receive text to display by the second computing device to the user. The recommendation engine 210 may receive audio content for playback by the second computing device to the user. The recommendation engine 210 may receive video content for playback by the second computing device to the user. The recommendation engine 210 may receive computer code for execution by the second computing device. Execution of the computer code may result in generation of an image and display of the image to the user of the second computing device.

The method 300 includes directing, by the recommendation engine, the second computing device to provide the user with access to the dynamically generated content (310). The recommendation engine 210 may direct the second computing device 202a to display text or images to the user. The recommendation engine 210 may direct the second computing device 202a to playback audio, video, or audiovisual content to the user. The recommendation engine 210 may direct the second computing device 202a to execute code generated by the LLM engine 250 and to display the output of the executed code to the user.

The recommendation engine 210 may access a data structure that provides instructions regarding how to determine a response to the user input. By way of example, and without limitation, the data structure may indicate that when user input is associated with a first type of characteristic, the recommendation engine 210 is to direct the display of a second segment of the video to the first user but when the user input is associated with a second type of characteristic the recommendation engine 210 is to establish a connection between the computing devices of the first user and a second user and that when the user input is associated with a third type of characteristic the recommendation engine 210 is to execute the LLM engine 250 to dynamically generate content to use in responding to the received user input.

In some embodiments, a teaching user who generates one or more segments of videos displayed to learning users may associate the one or more segments with one or more identifiers of concepts addressed in each segment. When the system 200 receives user input (including, without limitation, audio input, images and other visual content and so on), the system 200 may analyze the user input to identify one or more concepts associated with the user input and then determine whether the identified concept is addressed by any of the video segments; if not, or if the video segments have been ineffective in teaching a concept to the learning user, the system 200 may direct the LLM engine 250 to dynamically generate new content responsive to the concept or concepts in the user input.

In some embodiments the methods and systems described herein include functionality for accessing a video and generating a recommendation regarding segmentation of the video into a plurality of segments. The system 200 may analyze the received video and determine at least one break point at which there should be a break in the video in which a learning user may be asked a question and may provide user input responding to the question. The recommendation engine 210 may, for example, analyze other segmented videos with at least one characteristic in common with the received video, such as similar content, similar teachers, similar students, and so on. The recommendation engine 210 may generate a question or questions to ask after playing or making playback available of one of the segments of the video, based on identifying a concept in one of the segments of the video.

Furthermore, the recommendation engine 210 may generate a video including a question to ask after playback of a segment in a plurality of segments. The recommendation engine 210 may, for example, analyze a transcription of at least one segment of a video and generate a question to ask a learning user. A human teacher may not have the experience to know at what point in a lesson to ask a question or what type of question to ask, either given a particular lesson or a particular student; the recommendation engine 210 may therefore execute technology that generates not just any question to ask but accesses data associated with a lesson and/or a learning user to identify when during playback of a plurality of segments to present a generated question to the learning user. Therefore, the systems and methods described herein may provide functionality for automatically converting a video (which may be referred to as a static video since the video does not provide an opportunity for an interaction between learning users and teaching users) into a dynamic video that includes a plurality of segments so that playback of the video is converted into an interactive experience for the users.

Therefore, the system 200 may, as described in connection with FIG. 1, determine to establish a connection between a first user who has viewed a segment of a video and whom the system 200 has determined should connect with a second user in a synchronous ("live") video conference; however, the system 200 may also, as described in connection with FIG. 3, determine that prior to, or instead of, establishing the connection between the first user and a second user, the system 200 will execute the LLM engine 250 to generate a different response to the user input than might be achieved by playing another segment of the video or a different video. In so doing, the system 200 allows a learning user to benefit from the seamless generation and display of responses to the user input provided by the learning user in a manner that provides the learning user with content created specifically based on the user input the learning user provided. By having the LLM engine 250 generate audio or visual content (including, e.g., audio dialog, animations or digital avatars of a teaching user, etc.) and make that content available to the user seamlessly, the learning user may never realize that they are not receiving responses from the teacher depicted in the video the learning user viewed prior to receiving the dynamically generated content. The system 200 may, for example, generate a response to user input that is uttered using audio files of a teaching user's voice and which are played back to the user while a video with no teaching user visible is played—in this way, the learning user may view, for example, a white board with course material on it and hear the teaching user's voice and the system 200 may generate the illusion that the learning user is speaking with the teaching user. The display of one image while the system directs the playback of an audio file that has a teaching user's voice speaking dialog generated by the LLM engine 250 is one example in which the system 200 seamlessly provides a variety of types of content to address user input while ensuring that the seamless transition between the different types of content leaves the learning user under the impression that there has only been one teaching user teaching the learning user for the duration of the lesson.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIG. 1 and/or FIG. 3.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 4A:
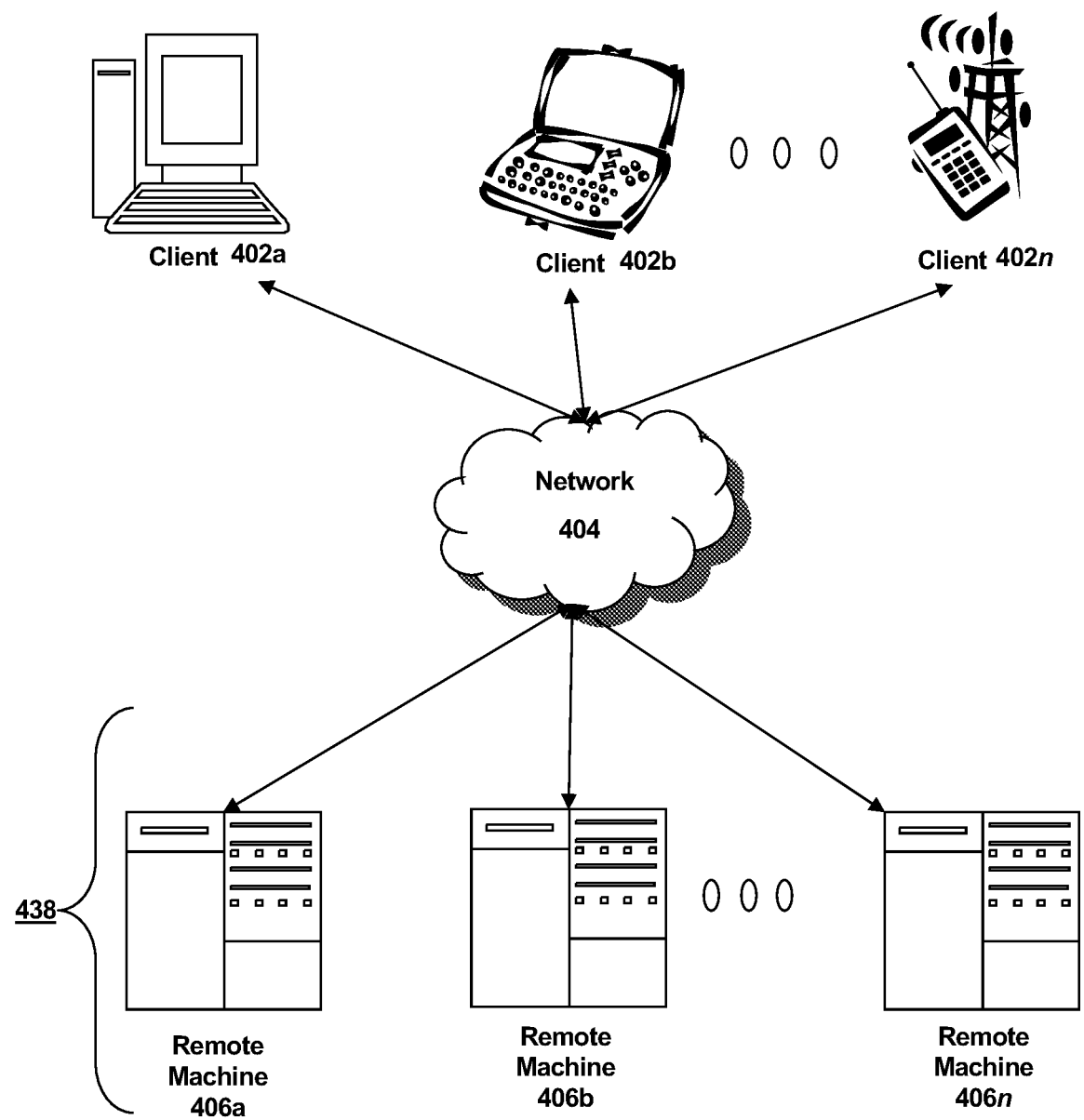
FIGS. 4A-4C are block diagrams depicting embodiments of computers useful in connection with the methods and systems described herein.
Figure 4B:
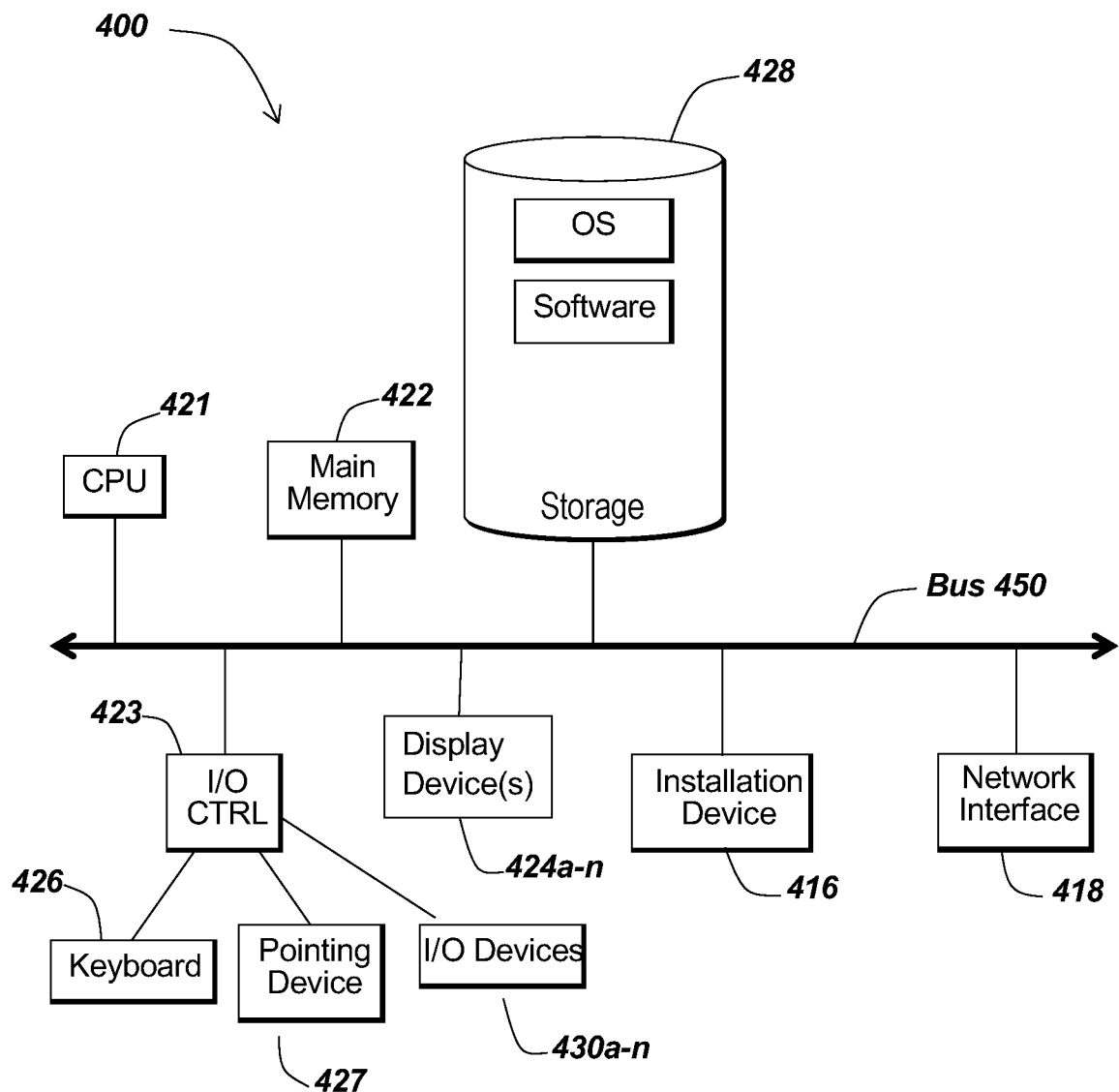
Figure 4C:
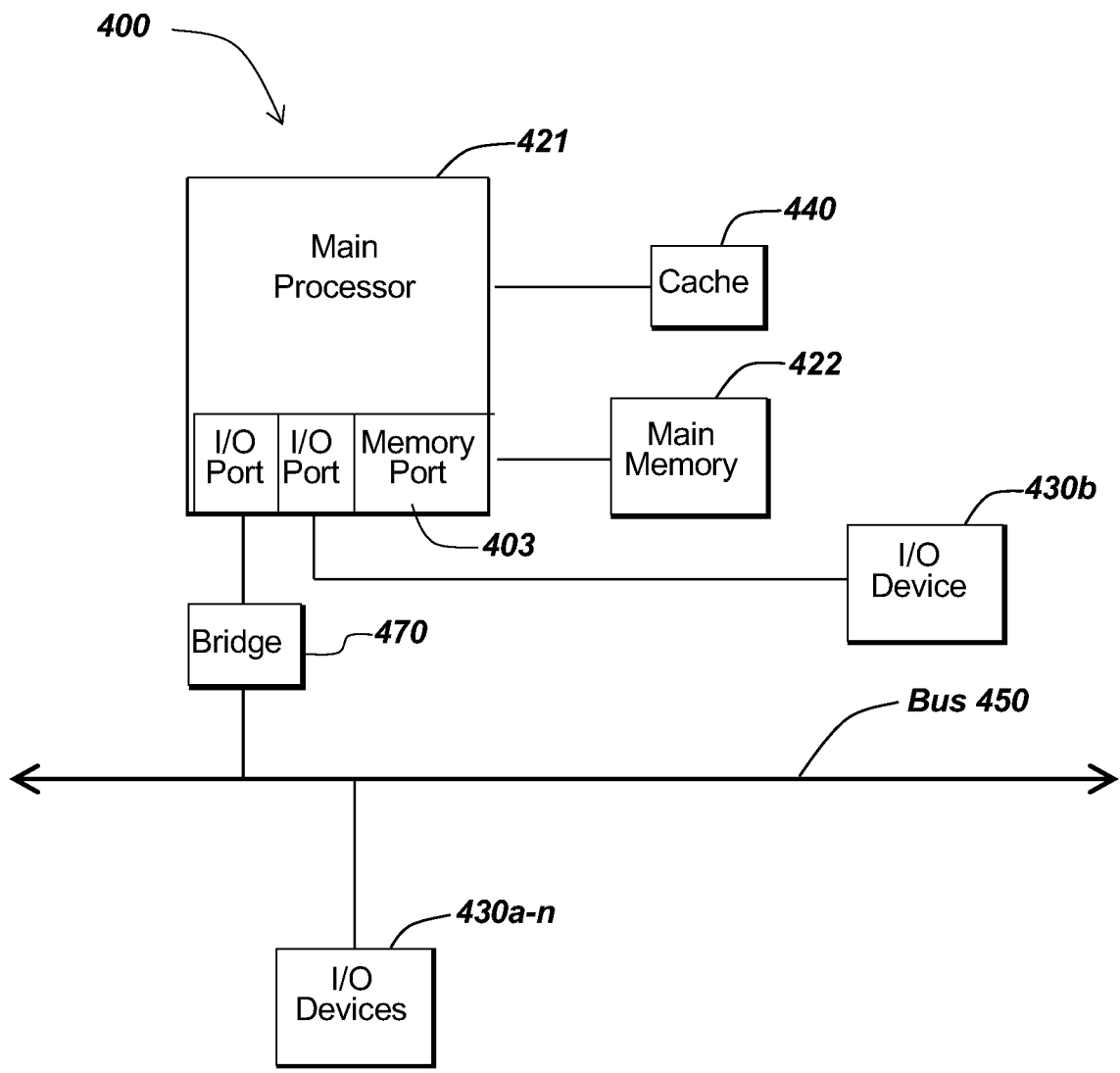

Referring now to FIGS. 4A, 4B, and 4C, block diagrams depict additional detail regarding computing devices that may be modified to execute novel, non-obvious functionality for implementing the methods and systems described above.

Referring now to FIG. 4A, an embodiment of a network environment is depicted. In brief overview, the network environment comprises one or more clients 402a-3402n (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks. In yet another embodiment, networks 404 and 404' may both be public networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400 or as machines 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 402.

In one embodiment, a computing device 406 provides functionality of a web server. The web server may be any type of web server, including web servers that are open-source web servers, web servers that execute proprietary software, and cloud-based web servers where a third party hosts the hardware executing the functionality of the web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 406. In one of these embodiments, the logical group of remote machines may be referred to as a server farm 438. In another of these embodiments, the server farm 438 may be administered as a single entity.

FIGS. 4B and 4C depict block diagrams of a computing device 400 useful for practicing an embodiment of the client 402 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424*a-n*, a keyboard 426, a pointing device 427, such as a mouse, and one or more other I/O devices 430*a-n*. The storage device 428 may include, without limitation, an operating system and software. As shown in FIG. 4C, each computing device 400 may also include additional optional elements, such as a memory port 403, a bridge 470, one or more input/output devices 430*a-n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display device 424, the processor 421 may use an Advanced Graphics Port (AGP) to communicate with the display device 424. FIG. 4C depicts an embodiment of a computing device 400 in which the main processor 421 also communicates directly with an I/O device 330*b* via, for example, HYPERTRANSPORT, RAPIDIO, or INFINIBAND communications technology.

One or more of a wide variety of I/O devices 430*a-n* may be present in or connected to the computing device 400, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 423 as shown in FIG. 4B. Furthermore, an I/O device may also provide storage and/or an installation device 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, CA.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS VISTA, and WINDOWS 10 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for dynamically generating content and providing access to dynamically generated content, it will be apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for dynamically generating content and providing access to dynamically generated content, during display of a first video to a user, the method comprising:
   receiving, by a recommendation engine executed by a first computing device, from a second computing device, a first user input responsive to a first segment of a video displayed to a user of the second computing device, the video comprising a plurality of segments;
   identifying, by the recommendation engine, at least one prompt associated with the first segment of the video;
   providing, by the recommendation engine, input to a large language model, the input including: (i) the at least one prompt; (ii) an instruction to analyze the at least one prompt and the first user input; and (iii) an instruction to generate a response to the first user input;
   receiving, by the recommendation engine, from the large language model, dynamically generated content responsive to the input; and
   directing, by the recommendation engine, the second computing device to provide the user with access to the dynamically generated content.

2. The method of claim 1, wherein receiving the dynamically generated content further comprises receiving text to display by the second computing device to the user.

3. The method of claim 1, wherein receiving the dynamically generated content further comprises receiving audio content for playback by the second computing device to the user.

4. The method of claim 1, wherein receiving the dynamically generated content further comprises receiving video content for playback by the second computing device to the user.

5. The method of claim 1, wherein receiving the dynamically generated content further comprises receiving computer code for execution by the second computing device.

6. The method of claim 5 further comprising executing, by the second computing device, to generate an image for display to the user.

7. The method of claim 1 further comprising:
   receiving, by the recommendation engine, from the second computing device, second user input from the user;
   analyzing, by the recommendation engine, the second user input;
   selecting, by the recommendation engine, from a plurality of users, a second segment of the video for display to the user, responsive to the analyzing of the second user input; and
   directing, by the first computing device, display of the second segment of the video by the second computing device.

8. The method of claim 1 further comprising generating an assessment that summarizes a level of learning of the student based upon at least one analysis of the first user input by the recommendation engine.

9. The method of claim 1 further comprising mapping an output of an analysis of at least one item of user input to a skill level and generating an assessment including the mapped skill level.

10. A method for dynamically generating and displaying, during display of a requested first video to a user, a second video, the method comprising:
    executing, by a first computing device, a large language model engine;
    providing, by a training engine executed by the first computing device, to the large language model engine, at least one question included in a first segment of a video;
    receiving, by the training engine, from the large language model engine, at least one response to the at least one question;
    analyzing, by the training engine, the received at least one response; and
    generating, by the training engine, a recommendation to modify a second segment of the video responsive to the analysis.

11. The method of claim 10 further comprising modifying, by the training engine, the second segment of the video.

12. The method of claim 10 further comprising modifying, by the training engine, the first segment of the video.

13. The method of claim 10 further comprising generating, by the training engine, a recommendation to modify the first segment of the video responsive to the analysis.

* * * * *